(12) United States Patent
Paixao

(10) Patent No.: US 11,025,970 B2
(45) Date of Patent: Jun. 1, 2021

(54) CONTROLLING BANDWIDTH USAGE BY MEDIA STREAMS BY LIMITING STREAMING OPTIONS PROVIDED TO CLIENT SYSTEMS

(71) Applicant: Fortinet, Inc., Sunnyvale, CA (US)

(72) Inventor: Pedro Miguel Paixao, Weston, FL (US)

(73) Assignee: Fortinet, Inc., Sunnyvale, CA (US)

(*) Notice: Subject to any disclaimer, the term of this patent is extended or adjusted under 35 U.S.C. 154(b) by 0 days.

(21) Appl. No.: 16/054,498

(22) Filed: Aug. 3, 2018

(65) Prior Publication Data
US 2020/0045351 A1 Feb. 6, 2020

(51) Int. Cl.
| | |
|---|---|
| H04N 21/2343 | (2011.01) |
| H04N 21/235 | (2011.01) |
| H04N 21/24 | (2011.01) |
| H04N 21/647 | (2011.01) |
| H04N 21/8355 | (2011.01) |
| H04L 29/06 | (2006.01) |

(52) U.S. Cl.
CPC ..... *H04N 21/2402* (2013.01); *H04L 63/0272* (2013.01); *H04L 63/1458* (2013.01); *H04L 65/4084* (2013.01); *H04N 21/2407* (2013.01)

(58) Field of Classification Search
CPC ........... H04N 21/2662; H04N 21/2385; H04N 21/2402; H04N 21/23439; H04N 21/2381; H04N 21/2393; H04N 21/64738; H04N 21/65
See application file for complete search history.

(56) References Cited

U.S. PATENT DOCUMENTS

| | | | | |
|---|---|---|---|---|
| 8,935,726 | B2* | 1/2015 | Patel | H04N 5/44543 725/44 |
| 2015/0373075 | A1* | 12/2015 | Perlman | H04L 65/608 709/217 |
| 2016/0308958 | A1* | 10/2016 | Navali | H04N 21/2662 |

* cited by examiner

*Primary Examiner* — Hsiungfei Peng
*Assistant Examiner* — Fred Peng
(74) *Attorney, Agent, or Firm* — HDC Intellectual Property Law, LLP

(57) ABSTRACT

Systems and methods for controlling network bandwidth utilization by media streaming services are provided. According to one embodiment, a data stream associated with streaming media content being requested from an external service provider by a client device associated with a private network is intercepted by a network manager associated with the private network. Streaming options made available for streaming the streaming media content are limited by the network manager by: (i) identifying a policy applicable to the data stream; (ii) identifying a manifest specifying multiple versions in which the streaming media content is available to be streamed, within the data stream; (iii) determining the multiple versions by parsing the manifest; (iv) determining a prohibited version that exceeds a bandwidth limitation specified by the policy; (v) updating the manifest by removing information regarding the prohibited version from the manifest; and (vi) providing the updated manifest to the client device.

16 Claims, 10 Drawing Sheets

470

```
<?xml version="1.0" encoding="UTF-8" ?>
- <MPD type="Live" availabilityStartTime="2010-07-01T05:00:00Z"
    availabilityEndTime="2010-07-08T05:00:00Z" mediaPresentationDuration="PT2H"
    minimumUpdatePeriodMPD="PT10S" minBufferTime="PT10S"
    timeShiftBufferDepth="PT30M" baseUrl="http://www.example.com/"
    xmlns:xsi="http://www.w3.org/2001/XMLSchema-instance"
    xsi:schemaLocation="urn:3GPP:ns:PSS:AdaptiveHTTPStreamingMPD:2009
    3GPP-MPD-r1.xsd"
    xmlns="urn:3GPP:ns:PSS:AdaptiveHTTPStreamingMPD:2009">
- <ProgramInformation moreInformationURL="http://www.example.com">
    <Title>Example</Title>
    <Source>Example</Source>
    <Copyright>Example</Copyright>
    </ProgramInformation>
- <Period start="PT0S" segmentAlignmentFlag="true" bitstreamSwitchingFlag="true">
- <Representation bandwidth="239000" width="320" height="240" lang="en"
    mimeType="video/3gpp; codecs=avc1.42E00b, mp4a.40.2">
- <SegmentInfo duration="PT10S">
    <InitialisationSegmentURL sourceURL="p1rep1.3gp" range="0-985" />
    <Url sourceURL="p1rep1.3gp" range="985-293761" />
    <Url sourceURL="p1rep1.3gp" range="293761-592501" />

. . .

<Url sourceURL="p1rep1.3gp" range="17304004-17600064" />
    <Url sourceURL="p1rep1.3gp" range="17600064-17894640" />
        </SegmentInfo>
        </Representation>
- <Representation bandwidth="892000" width="480" height="240" lang="en"
    mimeType="video/3gpp; codecs=avc1.42E015, mp4a.40.2">
- <SegmentInfo duration="PT10S">
    <InitialisationSegmentURL sourceURL="p3rep3.3gp" range="0-985" />
    <Url sourceURL="p3rep3.3gp" range="985-1126190" />
    <Url sourceURL="p3rep3.3gp" range="1126190-2228575" />

. . .

l sourceURL="p3rep3.3gp" range="64712374-65844317" />
    <Url sourceURL="p3rep3.3gp" range="65844317-66966044" />
        </SegmentInfo>
        </Representation>
        </Period>
        </MPD>
```

CONTROLLING BANDWIDTH USAGE BY MEDIA STREAMS BY LIMITING STREAMING OPTIONS PROVIDED TO CLIENT SYSTEMS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to network management. More particularly, embodiments of the present invention relate to network bandwidth optimization for media streams.

Description of the Related Art

Multimedia traffic, for example audio and/or video related traffic from streaming sites, has the potential for consuming a substantial portion of network bandwidth of an organization or a personal Internet connection. It has been observed that due to high usage of bandwidth by multimedia traffic, some essential enterprise network services may suffer or excessive bandwidth consumption may result. To control misuse of network bandwidth, many organizations have blocked some multimedia-related streaming services in their entirety. The typical choice available to organizations is one extreme or the other—either blocking or allowing all or streaming sites. However, such extremes do not provide a desirable technological solution for organizations. Also, such extremes preclude streaming services from being provided in limited Wi-Fi bandwidth environments, such as in-flight Wi-Fi provided by airlines.

It has also been observed when companies do allow multimedia streaming services to be accessed from within the enterprise network, they often face excessive bandwidth consumption as users typically stream the highest quality video possible, even though lower quality video is available and would be sufficient for their needs. A common high definition (HD) video stream can consume more than 2.5 Mbps, while the same content in standard definition (SD) uses around 0.7 Mbps. This represents 3.6 times less bandwidth per user for the same content. Similarly, an audio stream with premium quality (e.g., 320 Kbps) can consume 3.3 times more bandwidth than a normal quality audio stream at 96 Kbps. Some streaming service providers allow users to select from multiple available formats and resolutions (which may also interchangeably be referred to herein as different qualities of the content). For example, a service provider may provide the same video content in the following formats: 1080p (also known as full high-definition (FHD) characterized by a display resolution of 1920×1080 pixels, with progressive scanning, at a 16:9 aspect ratio), 720p (standard or half HD display resolution of 1280×720 pixels, with progressive scanning, at a 16:9 aspect ratio), 480p (e.g., 640×480 pixels, with progressive scanning, at a 4:3 aspect ratio), 360p (e.g., display resolution of 480×360, with progressive scanning, at a 4:3 aspect ratio), 240p (e.g., known as standard definition (SD) and characterized by a display resolution of 352×240), 144p (e.g., 256×144 pixels with progressive scanning) and allow users to select the format in which they would like to stream the video content based on the bandwidth that the users can afford or provide adaptive bitrate streaming based on currently available bandwidth.

An enormous amount of bandwidth can be saved while accommodating users' desire for streaming content if higher quality multimedia streams can be reasonably restricted rather than completely blocking the multimedia streams or multimedia services altogether.

SUMMARY

Systems and methods are described for controlling network bandwidth utilization by media streaming services by limiting streaming options provided to client systems. According to one embodiment, a data stream associated with streaming media content being requested from an external service provider by a client device associated with a private network is intercepted by a network manager associated with the private network. Streaming options made available for streaming the streaming media content from the external service provider to the client device are limited by the network manager by: (i) identifying a policy of multiple of active policies that is applicable to the data stream; (ii) identifying a manifest, containing information regarding multiple versions of the streaming media content that are available to be streamed by the external service provider, associated with the streaming media content within the data stream; (iii) determining the multiple versions by parsing the manifest; (iv) determining one or more prohibited versions of the multiple versions that exceed a bandwidth limitation specified by the policy; (v) updating the manifest by removing information regarding the one or more prohibited versions from the manifest; and (vi) providing the updated manifest to the client device.

Other features of embodiments of the present invention will be apparent from the accompanying drawings and from the detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4C illustrates an MPD file storing representations of different qualities of video that can be used to limit video quality options displayed to an end user in accordance with an embodiment of the present invention.

DETAILED DESCRIPTION

Figure 1:
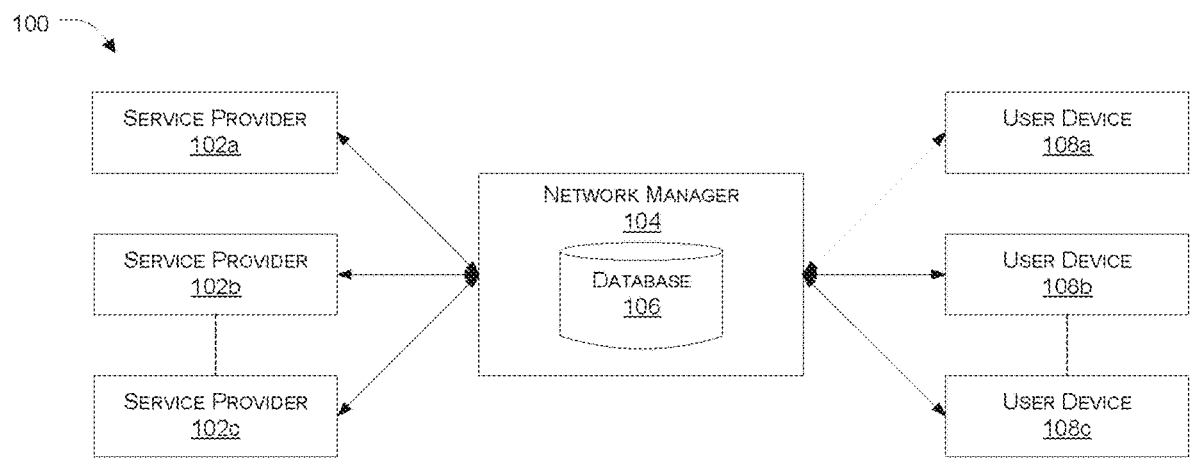
FIG. 1 illustrates a simplified high-level architecture showing a network manager, which is capable of intercepting responses from external service providers to media content requests initiated by user devices in order to optimize network bandwidth utilization in accordance with an embodiment of the present invention.

Systems and methods are described for controlling network bandwidth utilization by media streaming services by limiting streaming options provided to client systems. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, e.g. ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, e.g. software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named Different embodiments are described for controlling network bandwidth utilization by streaming services (e.g., audio and video streaming services) by limiting streaming options provided to client devices. System and methods are described for a network manager associated with a private network that is configured to intercept a data stream associated with multimedia content, for example, being requested from an external service provider by a client device associated with the private network, and limit streaming options made available to a user of the client device in relation to the multimedia content based on preconfigured policies. The network manager (which may be in the form of a network security device protecting the private network) identifies a policy from a list of preconfigured active policies that may be applicable to the intercepted data stream, reads a Media Presentation Description (MPD) manifest associated with the data stream when the data stream relates to multimedia content, determines based on the MPD manifest multiple available versions of the multimedia content, determines one or more prohibited versions of the available versions of the multimedia content that contradicts a bandwidth limitation specified by the policy, updates the MPD manifest by removing information regarding the one or more prohibited versions from the MPD manifest to comply with the policy and provides the updated MPD manifest to the client device. In this manner, an updated MPD manifest may be delivered to client devices that allows access to streaming multimedia content, but limits the steaming options thereby avoiding various disadvantages of current all-or-nothing solutions or traditional bandwidth controls that degrade user experience as the stream will most likely be interrupted while data is buffered locally.

For example, when a user requests multimedia content from a streaming server located outside a private network, a network manager preferably configured within a network security gateway of the private network intercepts interactions between the requesting client device and the streaming server to obtain the MPD manifest associated with the requested multimedia content, to determine available options (each option representative of a different version) being offered to the user, and to limit the version options to be made available to the user by removing one or more prohibited versions, thereby controlling bandwidth usage by removing version options that have a potential to cause bandwidth constraint. Despite the fact that a service provider might be able to stream media content in a large number of versions or formats, for example 360 degree, UHD, HD, SD etc., the network manager can limit the version options provided to the user at the user device only to HD and SD, for example, based on pre-configured policies. As those skilled in the art will appreciate, in this manner, the network manager can reduce the number of versions made available to the user, thereby enabling the network manager to control and limit bandwidth usage.

In some embodiments, the updated MPD manifest can be sent to the client device along with a default version selected from the multiple available versions of the multimedia content based on the policies. In an embodiment, the updated MPD manifest can be sent to the client device, which in turn can present the permissible versions pursuant to the updated MPD manifest to the user from which the user can then select a suitable version. On selection of a suitable version, multimedia content can be transmitted to the user in the selected format.

In some embodiment, the network manager or any other network device or client application installed at the user device can be configured to limit versions being displayed to the user.

In some embodiments, the active policies can be activated or deactivated, added or updated, based on any or combination of the current bandwidth utilization and predicted bandwidth utilization. One or more policies can be added to the list of preconfigured active policies or removed from preconfigured active policies based on overall current bandwidth utilization and/or based on predicted bandwidth utilization.

In some embodiments, the network manager maintains a list of preconfigured policies to be applied to a data stream. The preconfigured policies may be defined based on any or combination of user information, sub-net information, group information, a device type associated with the client device, and type of multimedia asset.

In some embodiments, the network manager may be in the form of or otherwise implemented within a unified threat management (UTM) device, an Intrusion Prevention System (IPS), Intrusion Detection System (IDS), a network security gateway device, a firewall or a Distributed Denial of Service (DDoS) prevention device, a software defined networking security device or a client application running on the client device.

In some embodiments, the plurality of available versions of the multimedia content may include but are not limited to 2160p content (Ultra-HD), 1080p content (Full HD), 720p content (Half HD), 480p content, 360p content, and 240p content.

As those skilled in the art will appreciate, multiple available versions of the multimedia content indicate availability of the multimedia content in different qualities. Streaming options indicate availability of the multimedia content in multiple versions that a user can selected from. Bandwidth consumption of each version of the multiple versions is different when streamed. As one may appreciate, by removing the prohibited versions from MPD manifest, list of available versions shown at the client device would be limited. In one embodiment, a version having potential to consume high bandwidth can be removed, hence bandwidth utilization by multimedia streaming services can be controlled.

While embodiments of the present invention are described with reference to filtering of available representations presented to an end user by removing those representations exceeding a predefined and/or configurable bandwidth threshold associated with a matching policy from a media presentation description (MPD) manifest, it should be appreciated that the methodology described herein is not limited to streaming media options being conveyed via an MPD manifest and has applicability to future alternative manifest formats.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, the terms "format" or "version" in relation to a particular representation of media content (e.g., audio and/or video content) generally refer to a an attribute (e.g., resolution, aspect ratio, size, encoding, bitrate or the like) or a combination of one or more attributes of the particular representation of media content.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and antispam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

FIG. 1 illustrates a simplified high-level architecture 100 showing a network manager 104, which is capable of intercepting responses from external service providers to media content requests initiated by user devices in order to optimize network bandwidth utilization in accordance with an embodiment of the present invention. As shown in FIG. 1, any user device, such as user device 108a, user device 108b, or user device 108c, which may be collectively referred to herein as user device 108a-c, can request streaming media content (e.g., audio, video or a combination of both audio and video) from a streaming service provider 102a-c. The user devices 108a-c may be in a variety of forms, including, but not limited to, a mobile device, a desktop computer, a laptop computer, a tablet computer, a set-top-box, or an Internet Television (IPTV). The requested media or multimedia content may be available for streaming by service provider in multiple versions, for example, 2160p content (Ultra-HD) version, 1080p content (Full HD) version, 720p content (Half HD) version, 480p version, 360p version, and 240p version. Responsive to the request for a particular media content resource issued by user device 108a-c, service provider 102a-c, which may be associated with a server outside of a private network with which network manager 104 is associated, generally responds with an MPD manifest, which includes details regarding all available versions in which the requested media content can be streamed to the user device 108a-c. User device 108a-c interprets the MPD manifest and presents the available versions to the end user. For example, a multimedia player running on user device 108a-c can interpret the MPD manifest and present the multiple versions in which the requested media content is available to the user to allow the user to select a suitable version. As noted above in the Background, users typically select the version with the highest quality of video, which in turn consumes the largest amount of bandwidth. When a user selects a high-quality version of streaming multimedia content, the data traffic associated with the multimedia content may consume an enormous amount of bandwidth. For example, a typical high definition (HD) video stream can consume more than 2.5 Mbps, while the same content in standard definition (SD) uses around 0.7 Mbps.

In an embodiment, to control bandwidth utilization by data traffic associated with streaming media content, a network manager 104 associated with the private network intercepts an HTTP response from service provider 102a-c containing the MPD manifest (which describes the available content, its various alternatives, their Uniform Resource Locator (URL) addresses, and other characteristics and segments, which contain the actual multimedia bit streams in the form of chunks, in single or multiple files) associated with media content requested by user device 108a-c and updates the MPD manifest so as to limit available representation options to be presented to the end user. For example, network manager 108 may remove one or more higher quality versions from list of available versions and present a limited number of versions on user device 108a-c. By doing so, bandwidth usage can be controlled as the user's streaming options are limited to those representations of the media content that consume less bandwidth.

In an embodiment, network manager 108 can be implemented within a network devices, such as a network security device, for example, a network security gateway, a firewall, a UTM appliance or the like. Alternatively, network manager 108 may be implemented as a standalone or dedicated device configured to control bandwidth usage by one or more user devices 108a-c of a private network.

Figure 2:
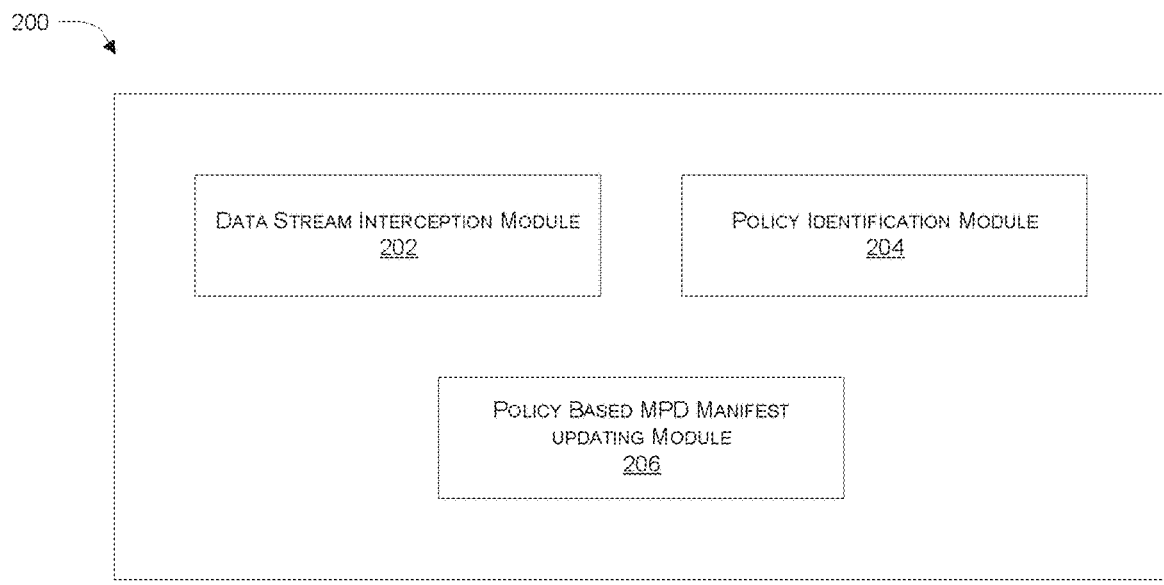
FIG. 2 illustrates exemplary functional modules of a system in accordance with an embodiment of the present invention.

FIG. 2 illustrates exemplary functional modules of a system 200 in accordance with an embodiment of the present invention. System 200 limits streaming options made available to a user of a client device in relation to requested streaming media or multimedia content, based on pre-configured policies. In an embodiment, system 200 includes a data stream interception module 202 configured within a network manager associated with a private network to intercept one or more interactions between a client device within the private network and a streaming service provider relating to streaming media content requested by the client device. System 200 also includes a policy identification module 204 configured within the network manager to identify a policy of multiple active policies defined by a network administrator of the network manager that is applicable to streaming of media content. System 200 further includes a policy based MPD manifest updating module 206 configured within the network manager for limiting streaming options made available to a user of the client device in relation to the requested streaming media content. According to one embodiment, policy based MPD manifest updating module 206 extracts the MPD manifest associated with requested streaming media content from a Hypertext Transfer Protocol (HTTP) response received from the streaming service provider, determines based on the MPD manifest the various formats in which the streaming media content is available to be delivered by the streaming service provider, determines one or more prohibited versions of the various available formats that exceed a bandwidth limitation specified by the policy, updates the MPD manifest by removing information regarding the one or more prohibited versions from the MPD manifest and provides the updated MPD manifest to the client device.

According to one embodiment, a network administrator can define one or more policies for streaming of media content so as to limit the versions of media content that are to be made available for streaming by end user devices. In some embodiments, policies can be defined based on any or combination of factors including, but not limited to a source Internet Protocol (IP) address (e.g., a source of the media content), a destination IP address (e.g., a destination of the media content), a protocol (e.g., HTTP), a user identifier, a genre associated with the media content, user information, sub-net information, group information, a service provider associated with the media content, a device type associated with the requesting client device and/or a format of the media content. For example, system 200 can enable a network administrator to define different policies for limiting permissible versions of streaming media content that are made available for selection by end users. In one embodiment, a single policy can be created for the entire private network or a default policy can be defined which can be applied in the absence of a more specific matching policy. In some embodiments, the network manager can be configured to limit the version options for all client devices in a similar manner. Any version options exceeding a predefined resolution or bandwidth threshold, for example, can be removed by the network manager from the MPD manifest. In an embodiment, a user identifier can be used to define policies, which may allow a set of VIP users to see all versions of the streaming media content as being provided by the service provider, while another set of users may be presented with a limited set of versions of the streaming media content. In some embodiments, attributes, such as the identity of the streaming service provider, can be used to define policies, which may allow multimedia streamed by certain service providers to be presented in all available versions, while multimedia of other streaming service providers can be provided to users in a limited number of versions. As those skilled in the art will appreciate, policies can also be tailored based on various other characteristics, including, but not limited to, time of day, day of week, one or more current bandwidth usage metrics (e.g., for the private network or for the user), different user groups, network segments, device types and service providers.

In an embodiment, the data stream interception module 202 can be configured at a network manager associated with a private network, to intercept a data stream associated with multimedia content being requested from an external service provider by a client device associated with the private network. Those skilled in the art will appreciate there are a variety of ways to identify an HTTP response containing an MPD manifest. In one embodiment, data stream interception module 202 identifies the HTTP response containing the MPD manifest by examining ingress HTTP traffic associated with Amazon Music, Prime Music, Apple Music, Google Play Music, Pandora, Slaker Radio, Spotify, Tidal, Netflix, Hulu, Amazon Video, Sling, Twitch, Youtube, Vevo and the like. In some embodiments, system 200 can be configured to allow all data streams, even if the data stream relates to multimedia content, if the multimedia request is requested from a device that is internal to the private network. In an embodiment, the data stream interception module 202 can be configured to inspect traffic data coming from outside the private network to check if the data stream relates to multimedia content.

In an embodiment, policy identification module 204 can be configured to identify one or more policies from multiple active policies defined by a network administrator of the network manager that may be applicable to the data stream at issue by matching various characteristics of the network traffic with the policy definitions. Based on header information associated with the data packets at issue, for example, different attributes such as user identifier, genre associated with multimedia content, source address, destination address, user information, sub-net information, group information, service provider address, end user device type etc. can be determined. As multiple policies are preconfigured using any or combination of these attributes, one or more policies from the predefined policies can be selected based on matching of attributes of the data packets of the data stream with attributes of the predefined policies. In some embodiments, new policies can be added to the list of active policies by user and an existing policy can be updated. In an embodiment, a policy can be automatically updated or added in to list of active policies based on present bandwidth consumption or predicted future bandwidth requirements, which can be predicted based on new or scheduled event information, for example.

In an embodiment, policy based MPD manifest updating module 206 can limit version options made available to a user of a client device in relation to requested streaming media content based on one or more policies identified by the policy determination module 204. The policy based MPD manifest updating module 206 can be configured to read the data stream (e.g., an HTTP exchange between a client device and a streaming media service provider) and identify a Media Presentation Description (MPD) manifest associated with the data stream. The MPD manifest is typically returned in an HTTP response from a streaming media service provider in response to receipt of an HTTP request from a client device relating to a particular streaming media resource. Responsive to locating the MPD manifest within a data stream, policy based MPD manifest updating module 206 parses the MPD manifest and determines the various versions in which the requested media resource is available for streaming by the streaming media service provider based on the representation information included in the MPD manifest.

As those skilled in the art will appreciate, a service provider or cloud service providing multimedia services, sends an MPD manifest identifying various representations of streaming media content that are available for a requested media resource. The MPD manifest includes details about all available versions in which the streaming media content can be presented to the requesting user. The MPD manifest, also known as an MPEG-DASH MPD manifest, is an eXtensible Markup Language (XML) document that contains information about media segments, their relationships and information necessary to choose between them, and other metadata that may be needed by a user of a client device. A typical MPD manifest contains information including, but not limiting to, period, adaptation sets, representation, sub-representation, media segments, and index segments.

Periods contained in the top-level MPD element, describe a part of the content with a start time and duration. As those skilled in the art appreciate, multiple periods can be used for scenes or chapters, or to separate ads from program content, which are logically separable. Each period may represent a chapter or a part of the multimedia content divided in multiple parts using logical partitioning. Adaptation sets contain a media stream or set of media streams. In the simplest case, a period may have one adaptation set containing all audio and video for the content at issue, but to reduce bandwidth, each stream can be split into a different adaptation set. A common case is to have one video adaptation set, and multiple audio adaptation sets (one for each supported language). Adaptation sets can also contain subtitles or arbitrary metadata.

Information associated with all available versions is included as part of representations information in the MPD manifest. Representations allow an adaption set to contain the same content encoded in different ways. In most cases, representations are provided in multiple screen sizes and bandwidths, which is an indication of available versions in which a particular media resource is available. In case of adaptive streaming, representations are chosen automatically based on different factors including, but not limited to, available bandwidth.

Of the multiple versions specified by the MPD manifest as being available for streaming, policy based MPD manifest updating module 206 can determine one or more prohibited versions of the media content at issue that exceeds a bandwidth limitation, for example, specified by the policy. Policy based MPD manifest updating module 206 then updates the MPD manifest by removing information regarding the one or more prohibited versions from the MPD manifest and provides the updated MPD manifest to the requesting client device.

In this manner, system 200 updates the representation information within the MPD manifest, so that the client device gets to choose from only limited options that are acceptable based on policies specified by the network administrator. In embodiments in which the client device automatically makes a selection of the representation, due the limited number of options provided to the client device, the selection would necessarily be made from only those limited representations and hence bandwidth usages can be controlled. Similarly, in some embodiments, where a user selects the version in which he/she wants to experience the media content, the user's options are limited to those remaining after the MPD manifest has been updated to remove prohibited versions (e.g., those exceeding a predetermined or configurable bandwidth threshold).

In some embodiments, policy based MPD manifest updating module 206 can be configured not to limit version options, when the media content source is part of a whitelisted set of content sources or part of whitelisted genre, for example.

In an embodiment, the media content can include a combination of one or more of text, graphics, drawings, still and moving images (video), animation, audio, and other media, which can be streamed in different qualities, each quality consuming a different amount of bandwidth.

Figure 3:
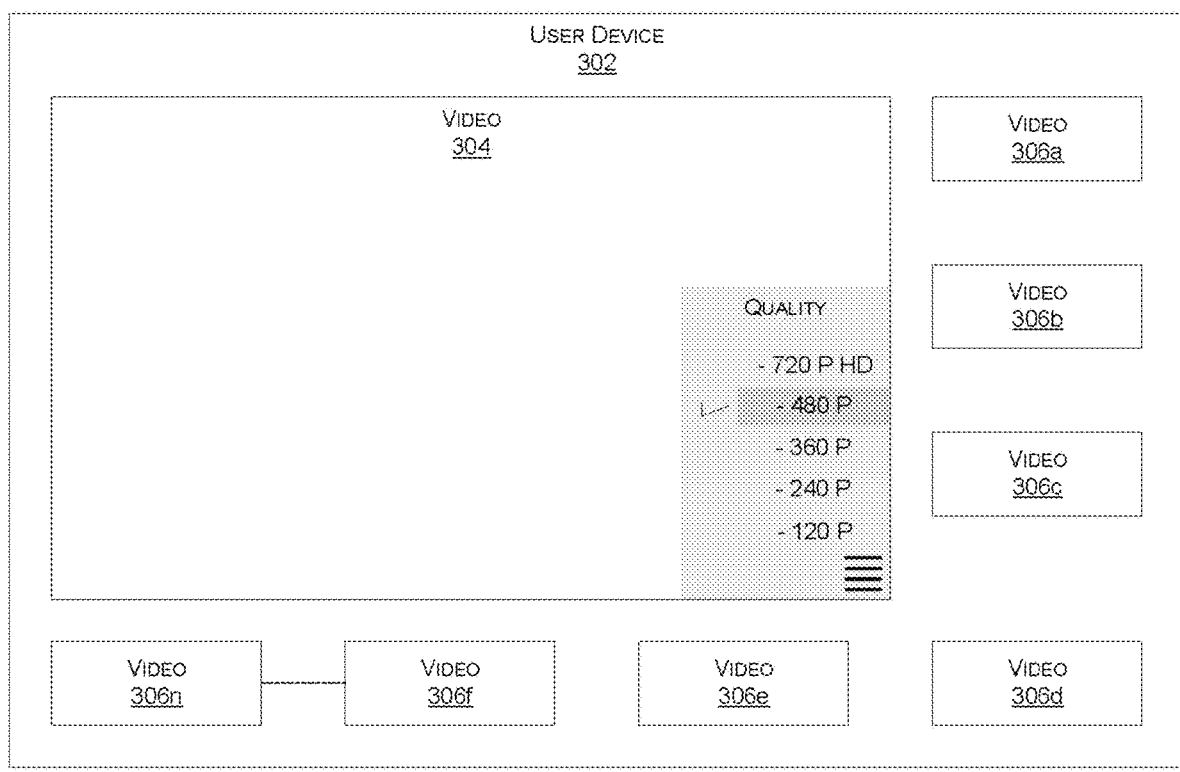
FIG. 3 illustrates various representations of video content available to be streamed to a user device in multiple quality formats, which can be limited in order to optimize network bandwidth usage, in accordance with an embodiment of the present invention.

FIG. 3 illustrates video content available to be streamed to a user device in multiple quality formats, which can be limited in order to optimize network bandwidth usage, in accordance with an embodiment of the present invention. For a selected video 304 played through a browser, media or multimedia player, multiple versions may be available for streaming from the service provider to user device 302 and options can be provided to the user from which he/she can choose a suitable version. A web interface or a player interface can show a requested video 304 on user device 302. One or more other videos 306a-n related to selected video 304 can be provided as suggestions to the user.

As shown in FIG. 3, a user can be presented with the ability to select a quality of video 304 from multiple available qualities, such as 720p, 480p, 360p, 240p and 120p. These number and letter combinations represent exemplary video resolutions in which the number portion indicates the vertical resolution (or the number of horizontal lines) the video has from top to bottom and the letter indicates whether all the lines are drawn in each frame (e.g., progressive scanning) or whether the odd lines and even lines of each frame are drawn in alternative frames (e.g., interlaced scanning). In the context of the present example, the user has selected to watch video 304 in 480p. The list of versions, which may also be referred to herein as available quality options, are shown from the MPD manifest and can be read, interpreted and presented by a multimedia player or web-browser player running on user device 302.

As noted above, in an embodiment, the version options presented to the user for video 304 can be limited by updating the MPD manifest. For example, the 720p quality can be removed from the MPD manifest before being delivered to user device 302, thereby leaving the options of 480p, 360p, 240 and 120p available for selection by the user. As the option of 720p is removed, the user will not have the ability to select and watch video 304 in 720p quality, which would have consumed more bandwidth. By limiting options of available qualities that are presented to the user, system 200 controls the bandwidth usage within the private network (e.g., enterprise network) at issue.

Figure 4A:
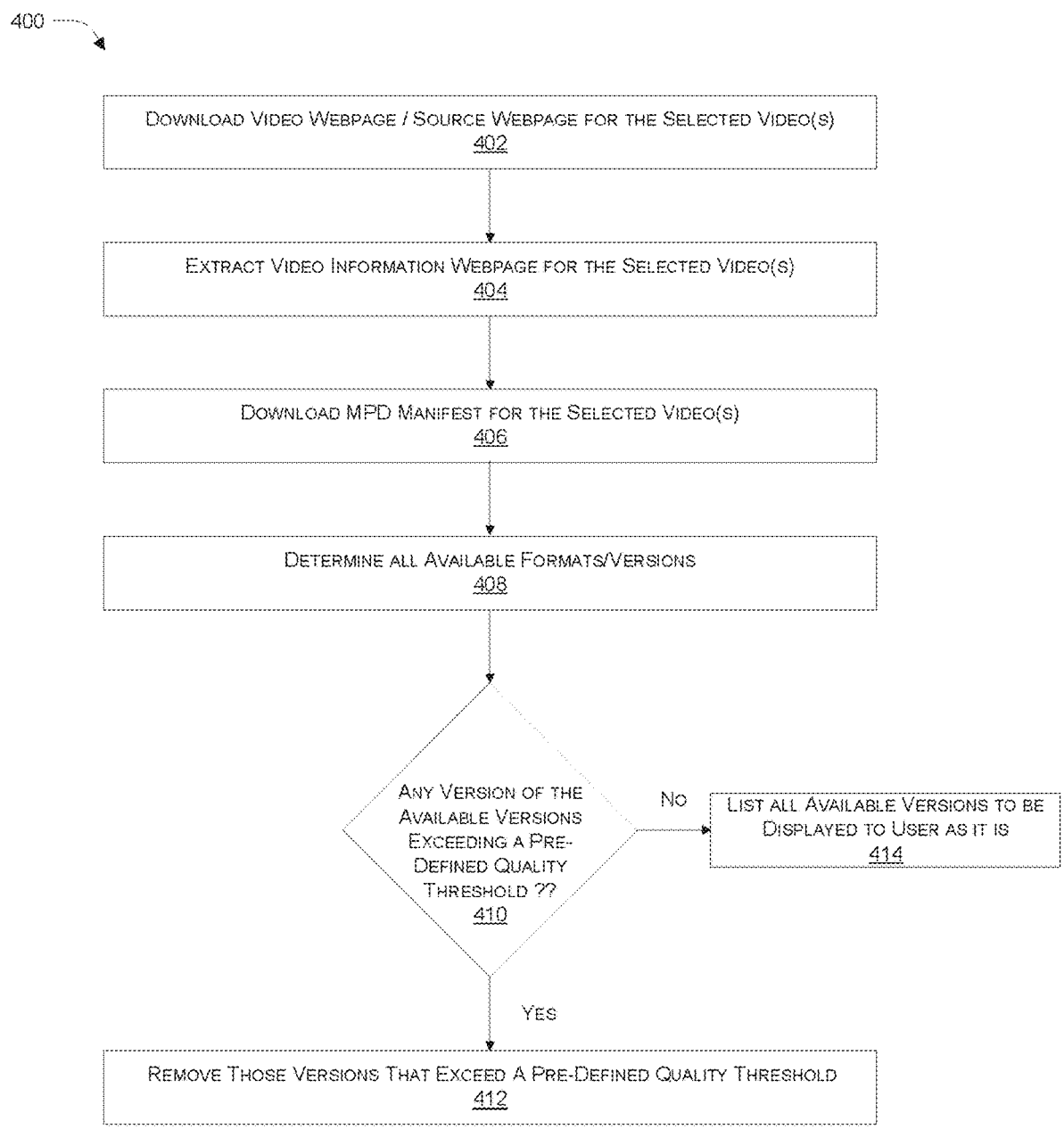
FIG. 4A is a flow diagram illustrating filtering of high quality video formats from those options to be made available to an end user in accordance with an embodiment of the present invention.

FIG. 4A is a flow diagram 400 illustrating filtering of high quality video formats from those options to be made available to an end user in accordance with an embodiment of the present invention. In an embodiment, when a user selects a video to watch, an end user device may download a video web-page/source webpage for the selected video from a source as shown at step 402, extract video information webpage for the selected video as shown at step 404, download the MPD manifest for the selected video as shown at step 406 and determine all available formats/versions as shown at step 408. The system further determines, whether there are any versions of the available versions that exceed a pre-defined quality threshold as shown at step 410. When there are one or more versions that exceed the pre-defined quality threshold, the system updates the MPD manifest by removing those versions that exceed the pre-defined quality threshold as shown at step 412. The predefined quality threshold can be specified as part of a policy. In one embodiment, where none of the version of the available versions exceeds the predefined quality threshold, all available versions are displayed to user as is, as shown at step 414.

Figure 4B:
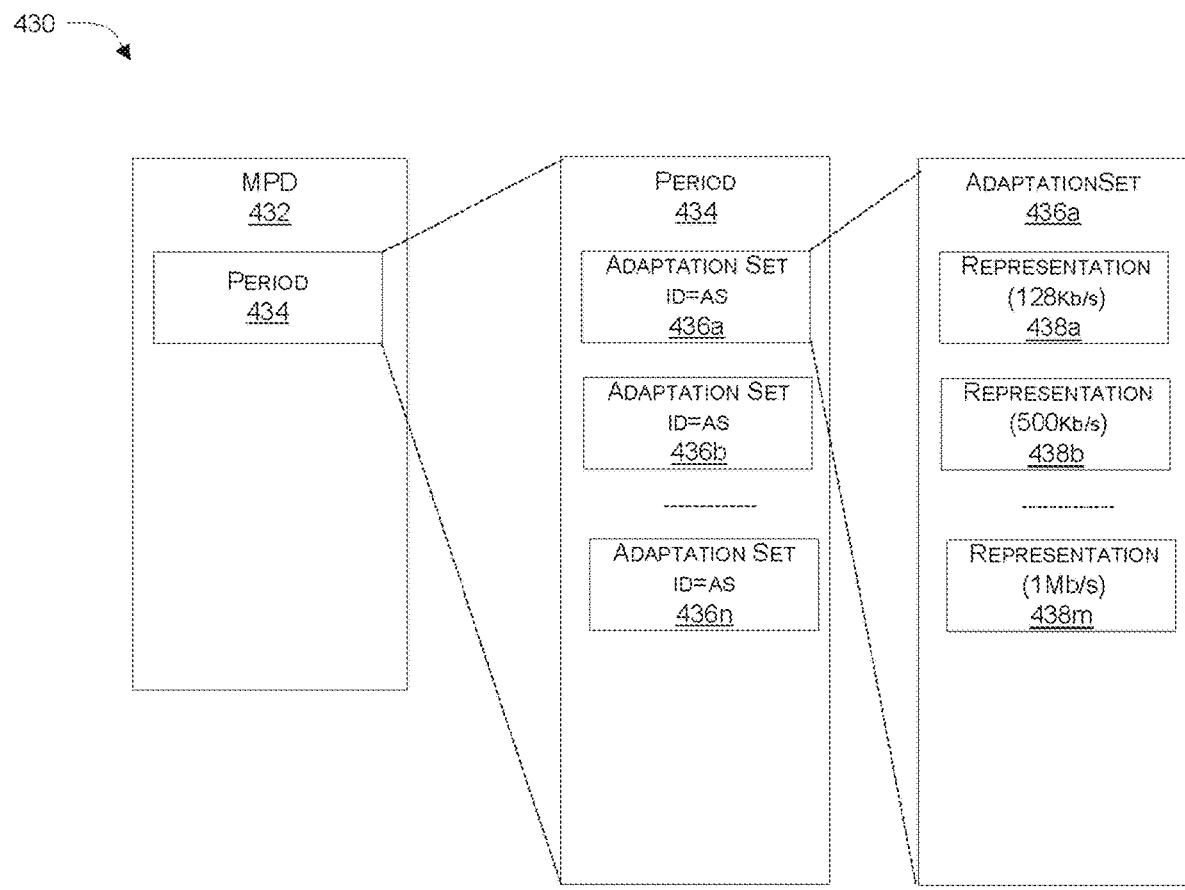
FIG. 4B is a block diagram illustrating the structure of a media presentation description (MPD) manifest storing representations of different qualities of video that can be used to limit video quality options displayed to an end user in accordance with an embodiment of the present invention.

FIG. 4B is a block diagram 430 illustrating the structure of a media presentation description (MPD) manifest storing representations of different qualities of video that can be used to limit video quality options displayed to an end user in accordance with an embodiment of the present invention. As shown in FIG. 4B, an MPD manifest 432, which may be represented in the form of an XML file, may include information including, but not limited to, period 434, adaptations 436*a-n*, representations 438*a-m*, sub-representations etc. Period 434 describes a part of the content with a start time and duration. Multiple periods can be used for scenes or chapters, or to separate ads from program content. Each period may represent one a chapter or a part of an entire multimedia content divided in multiple parts using logical partitioning. Each period 434 may have one or more adaptations 436*a-n*. Each adaption 436*a-n* can include a description related to representations 438*a-m*. Representation information is an indication of available versions in which multimedia content is available. The MPD manifest is created by the service provider for each multimedia content resource that it offers.

FIG. 4C illustrates an MPD manifest 470, storing representations of different qualities of video, that can be used to limit video quality options displayed to an end user in accordance with an embodiment of the present invention. MPD manifest 470 describes representation information for a given period of video. As shown in FIG. 4C, for a given period, representations indicate availability of two versions. Representation 472 provides information associated with a first version, in which a segment of video can be played with screen size of width 320 and height 240. Representation 474 provides information associated with a second version, in which video can be played with screen size of width 480 and height 240. As those skilled in the art will appreciate, if a user selects the second version to play the video, the client device will consumer more bandwidth as compared to the bandwidth required by playing the first versions. In an embodiment, the system can remove part of the representation information related to the second version, for example, to limit the options available for streaming by the client device. For example, the system can update these representations to exclude versions based on a policy of a plurality of pre-defined policies that matches the data stream exchange between the client device and the streaming media service provider.

Figure 5:
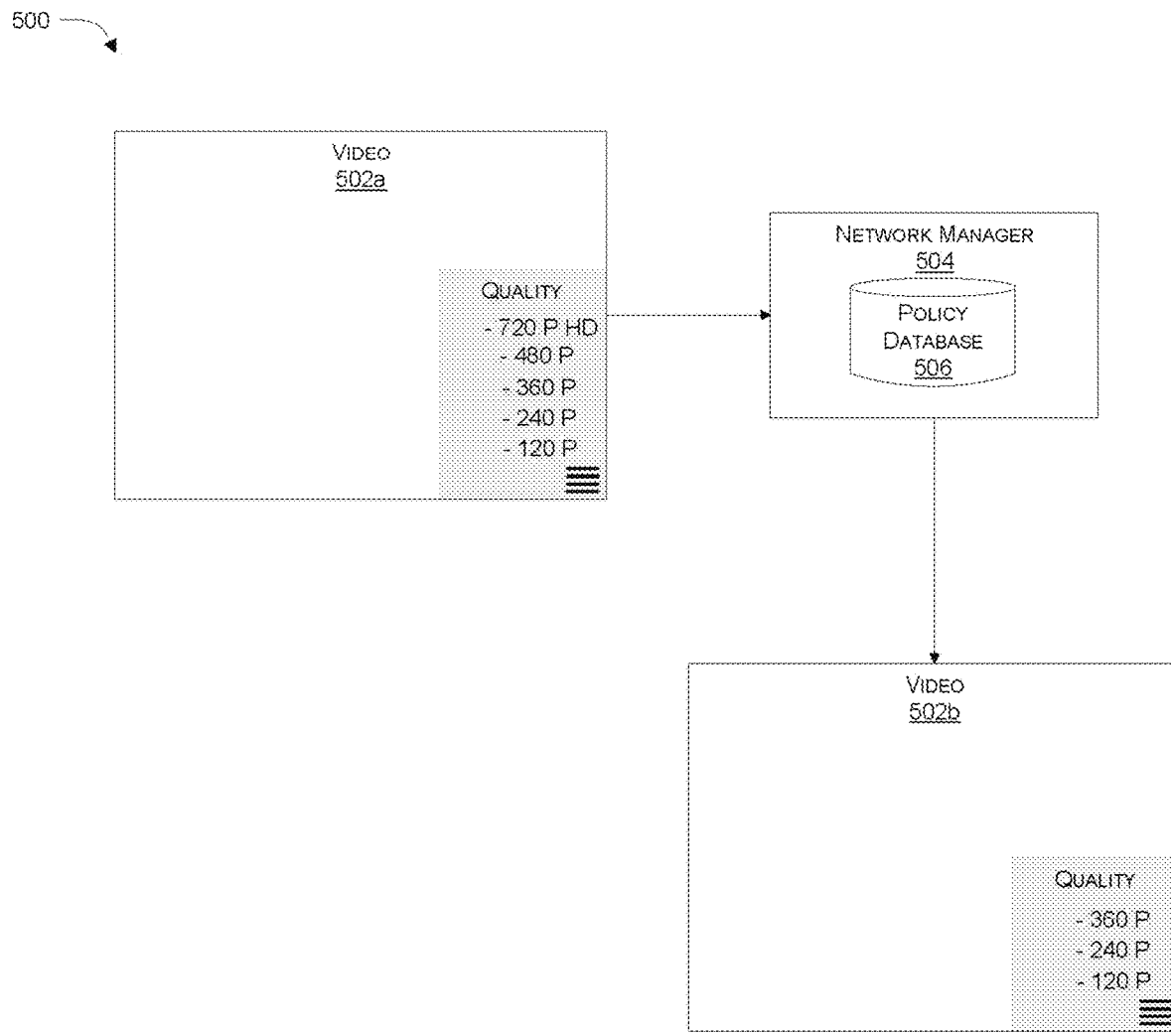
FIG. 5 is a simplified block diagram conceptually illustrating the filtering of available video quality options by a network manager for presentation to an end user in accordance with an embodiment of the present invention.

FIG. 5 is a simplified block diagram 500 conceptually illustrating the filtering of available video quality options by a network manager for presentation to an end user in accordance with an embodiment of the present invention. As shown in FIG. 5, an original video 502*a* offered by a service provider may be available in multiple qualities, such as 720p, 480p, 360p, 240p, and 120p. In an embodiment, a network manager 504 can intercept a data stream associated with video 502*a*, read the MPD manifest associated with video 502*a*, identify a matching policy stored in the policy database 506 and update the MPD manifest of video 502*a* before forwarding the MPD manifest with limited versions (depicted as video 502*b*) to user on client device. Based on the preconfigured policies available in policy database 506, network manager 504 can delete information associated with versions 720p and 480p from the MPD manifest, for example. As a result of the removal of the information regarding the availability of video 502*a* in 720p and 480p format, the end user of the requesting client device, will be presented with the option of selecting from the remaining limited versions, for example, 360p, 240p and 120p, from which the user can select a suitable version.

While various embodiments have been described with reference to removing higher quality versions, it is certainly possible in alternative implementations to remove lower quality versions for different use cases. For example, in an embodiment, if a multimedia content resource is requested by an HDTV and the multimedia content is available only in 120p quality, network manager 504 can block such multimedia content, if a policy to that effect has been pre-configured. In this manner, network manager 504 can block multimedia content that does not comply with preconfigured policies.

Figure 6A:
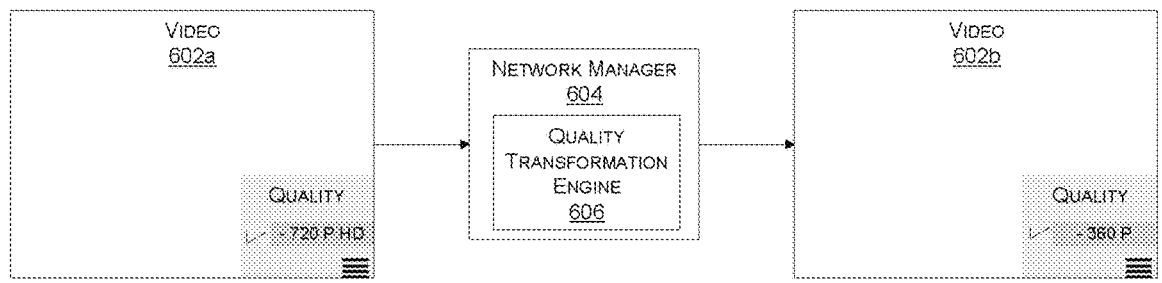
FIG. 6A is a simplified block diagram conceptually illustrating quality transformation of multimedia content by a network manager in accordance with an embodiment of the present invention.

FIG. 6A is a simplified block diagram 600 conceptually illustrating quality transformation of multimedia content by a network manager in accordance with an embodiment of the present invention. In the context of the present example, to reduce the bandwidth consumed by a private network, a network manager 604 can be configured with a content quality transformation engine 606, which can receive the content in a higher quality and convert the content for presentation to an end user in a lower quality. For example, a video 602*a* originally transmitted by a service provider with 720p quality, can be converted into video 602*b* to be presented to user in 360p quality. Network manager 604 can refer one or more preconfigured rules to transform a video of one quality into video of another quality. Quality transformation engine 606 can be an adaptive bit rate decoder/encoder combination. In an embodiment, network manger 604 can be configured within a network gateway device and can transform any multimedia content of higher quality, received from outside of the private network, to a multimedia content of lower quality to be distributed within the private network or to transmit to any client device of the private network.

Figure 6B:
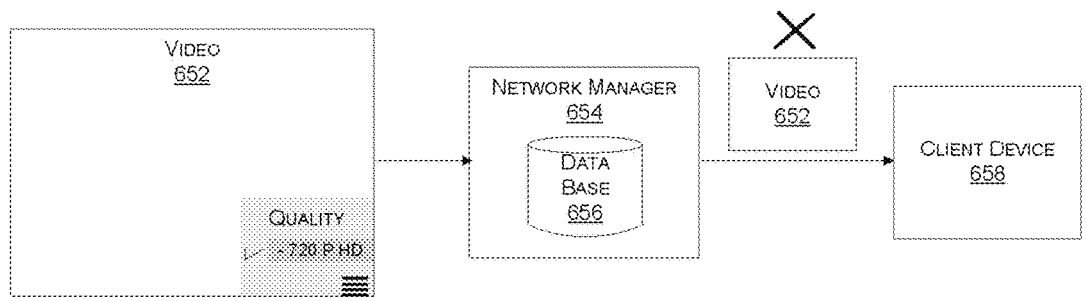
FIG. 6B is a simplified block diagram conceptually illustrating blocking of requested multimedia content by a network manager if bandwidth requirements for all available representations exceed a defined threshold in accordance with an embodiment of the present invention.

FIG. 6B is a simplified block diagram 650 conceptually illustrating blocking of requested multimedia content by a network manager if all available qualities are greater than a defined threshold in accordance with an embodiment of the present invention. In the context of the present example, in which all available versions of a requested multimedia content resource are greater than a threshold quality (e.g., 480p), and network manager doesn't implement a quality transformation engine as described in connection with FIG. 6B, network manager 654 can completely block the multimedia content and send a message to client device 658 to indicate the reasons for blocking the requested multimedia content. For example, when a video 652*a* is only available in 720p quality, which is banned by the network administrator as per preconfigured policies stored in database 656, network manger 654 can block transmission of the requested multimedia content to the client device and send a message to the client device indicating that the requested multimedia content is not available in a permissible quality.

Figure 7:
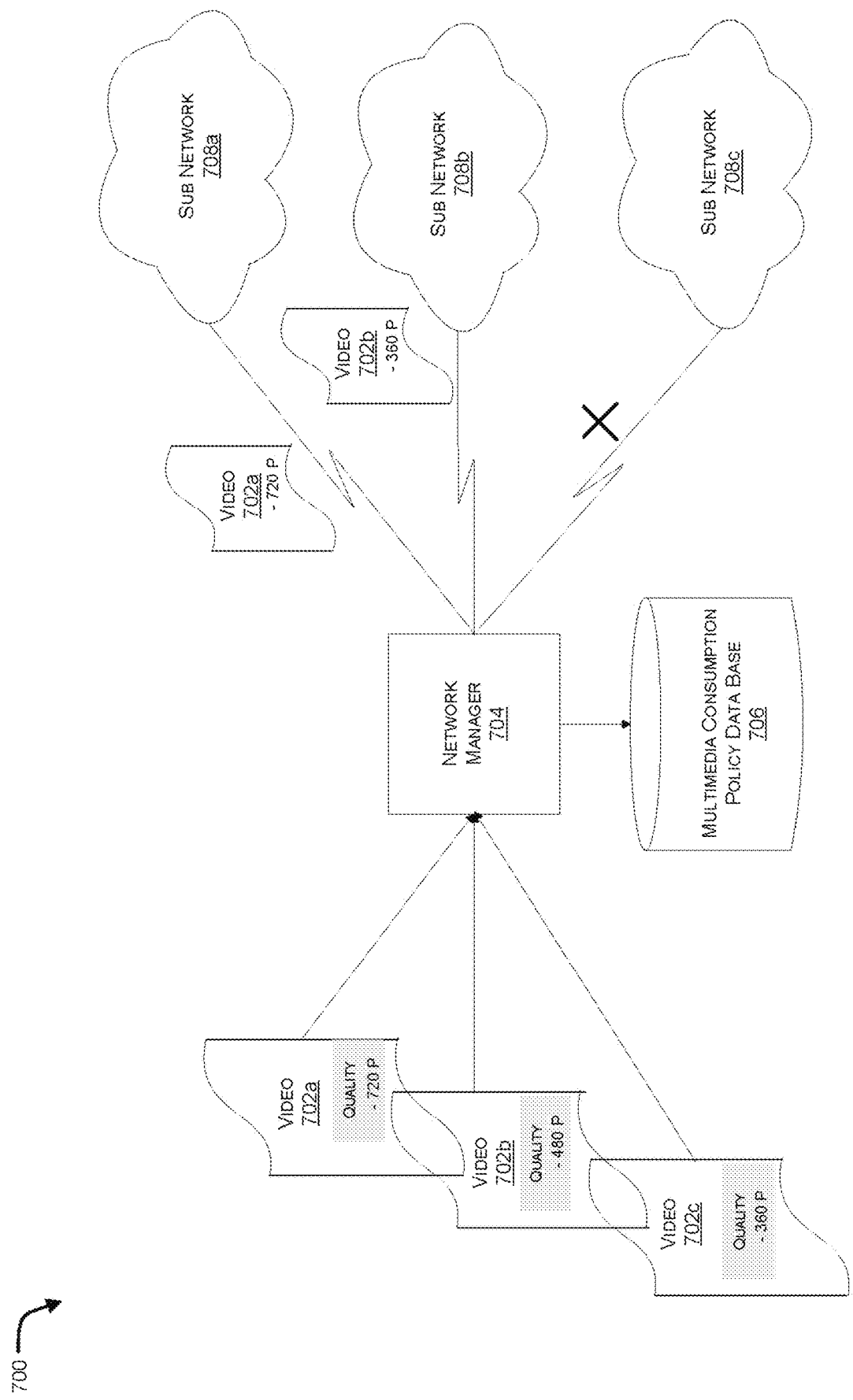
FIG. 7 is a simplified block diagram illustrating application of multimedia consumption policies by a network manager in accordance with an embodiment of the present disclosure.

In some embodiment, for different groups of users or different sub-network, different policies with respect to versions of multimedia to be made available to users, can be applied. FIG. 7 is a simplified block diagram 700 illustrating application of multimedia consumption policies by a network manager in accordance with an embodiment of the present invention. In the context of the present example, a network manger 704 can refer to a multimedia consumption policy database 706 to limit options of available versions of multimedia content to different groups of users or client devices. In an embodiment, a first set of users may have one threshold, while another set of users may have a different threshold of version quality that needs to be applied. In one embodiment, HD or higher versions may be prohibited for the first set of users, and HD versions may be allowed but UHD and higher versions may be prohibited for a second set of users.

For example, a video may be originally available from an external streaming media service provider in 720p quality as video 702a, in 480p quality as video 702b and in 360p as video 702c. When the video is requested by an end user device associated with a different sub-network, for example, sub-network 708a, sub-network 708b and sun-network 708c, network manager can allow 720p quality for the end user devices for sub-network 708a, 360p quality to end user devices of sub-network 708b and no video to end user devices of sub-network 708c. It is possible that an administrator of a private network may want to allow different user groups to watch multimedia content in different qualities. For example, an administrator of a university network can configure policies at the network manager 704 to allow higher quality options to professors and university staff, reasonable quality options to students and no multimedia traffic for a guest network.

Figure 8:
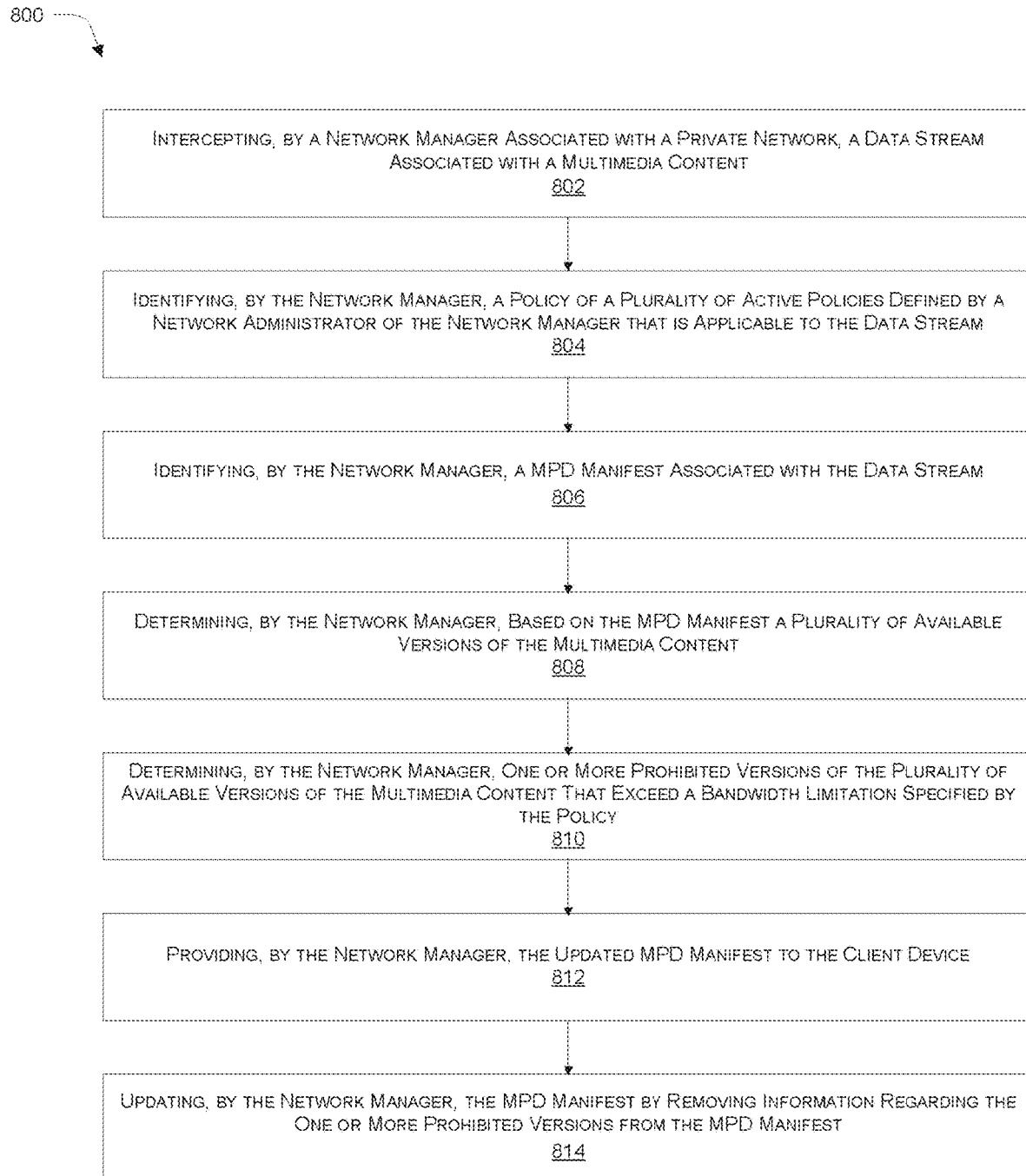
FIG. 8 is a flow diagram illustrating a process of limiting available versions of multimedia content to be presented to an end user in accordance with an embodiment of the present invention.

FIG. 8 is a flow diagram 800 illustrating a process of limiting available versions of multimedia content to be presented to an end user in accordance with an embodiment of the present invention. In the context of the present example, the process starts at block 802 in which a network manager associated with a private network intercepts a data stream associated with a multimedia content resource being requested from an external service provider by a client device associated with the private network. For example, the network manager may intercept an HTTP response from the external service provider containing an MPD manifest for the requested multimedia content resource.

As block 804, the network manager identifies a policy of multiple active policies defined by a network administrator of the network manager that is applicable to the data stream. In an embodiment, header information of data packets associated with the multimedia traffic can be inspected to identify one or more attributes, which will be matched with attributes of the preconfigured policies for identifying a policy from list of active policies.

At block 806, the network manager identifies an MPD manifest associated with the data stream.

At block 806, the network manager determines, based on the MPD manifest, the various versions of the multimedia content that are capable of being streamed by the external service provider.

At block 808, the network manager determines one or more prohibited versions of the available versions of the multimedia content. For example, the matching policy may specify a maximum bandwidth threshold that may not be exceeded. In this case, all available versions having a bandwidth requirement that would exceed the maximum bandwidth threshold would be considered prohibited versions.

At block 810, the network manager updates the MPD manifest by removing information regarding the one or more prohibited versions from the MPD manifest. In an embodiment, information associated with one or more prohibited versions can be removed from the MPD manifest. Part of representations information of the MPD manifest can be deleted to remove details of the one or more prohibited versions. As those skilled in the art will appreciate, representations information can be updated for all the adaptation sets of all periods of the multimedia content.

At block 812, the network manager, provides the updated MPD manifest to the client device.

Figure 9:
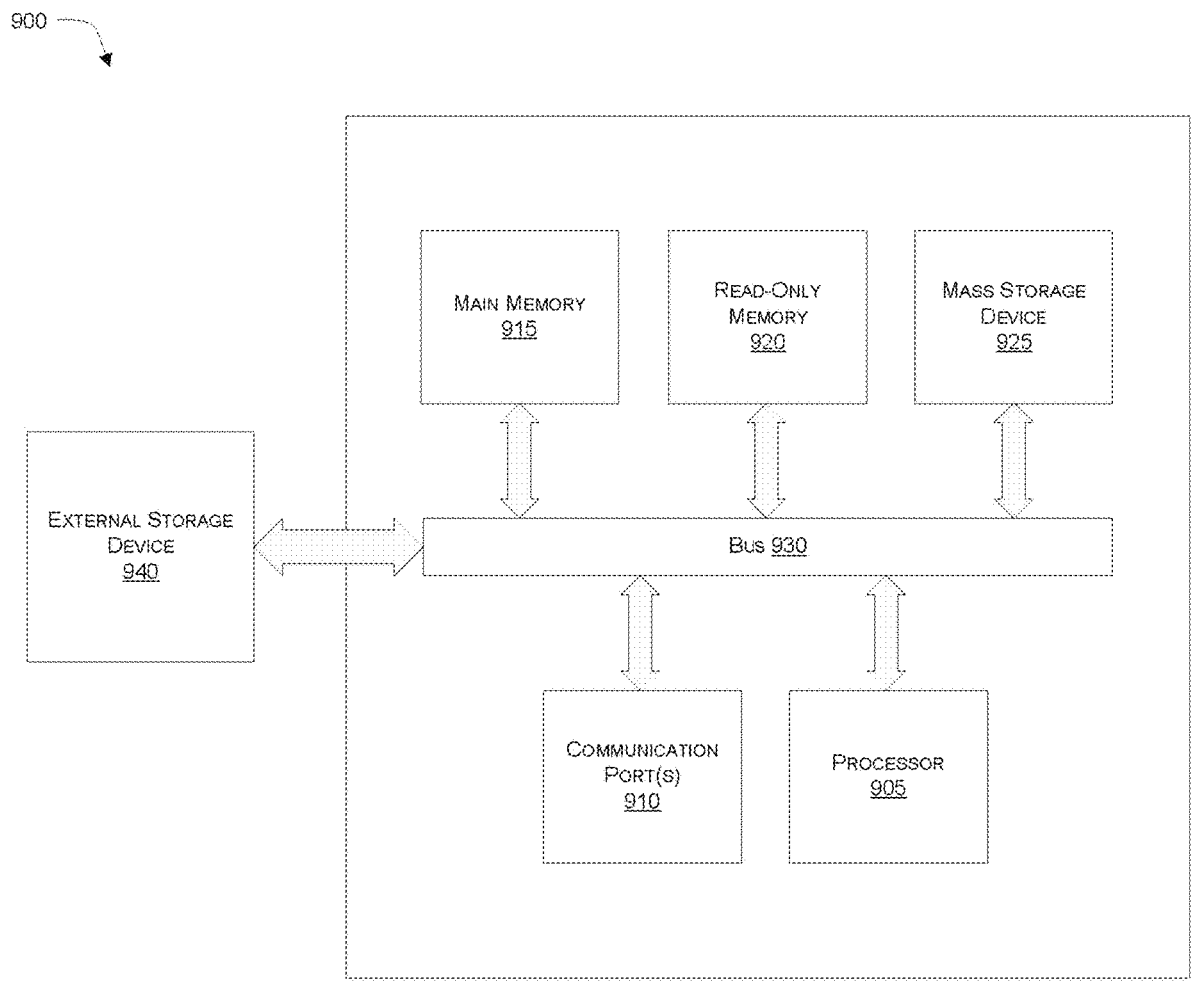
FIG. 9 is an example of a computer system with which embodiments of the present disclosure may be utilized.

FIG. 9 is an example of a computer system with which embodiments of the present disclosure may be utilized. Computer system 900 may represent or form a part of a network manager (e.g., network manager 104, 504, 604, 654 or 704). The computer system 700 can be configured to implement system 200 and execute the steps of method 800 as described above with reference to FIG. 8.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 900 includes a bus 930, a processor 905, communication port 910, a main memory 915, a removable storage media 940, a Read-Only Memory (RAM) 920 and a mass storage 925. A person skilled in the art will appreciate that computer system 900 may include more than one processor and communication ports.

Examples of processor 905 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 905 may include various modules associated with embodiments of the present invention.

Communication port 910 can be any of an RS-232 port for use with a modem based dialup connection, a 10/100 Ethernet port, a Gigabit or 10 Gigabit port using copper or fiber, a serial port, a parallel port, or other existing or future ports. Communication port 910 may be chosen depending on a network, such a Local Area Network (LAN), Wide Area Network (WAN), or any network to which computer system 900 connects.

Memory 915 can be Random Access Memory (RAM), or any other dynamic storage device commonly known in the art. Read only memory 920 can be any static storage device(s) such as, but not limited to, a Programmable Read Only Memory (PROM) chips for storing static information such as start-up or BIOS instructions for processor 905.

Mass storage 925 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 930 communicatively couples processor(s) 905 with the other memory, storage and communication blocks. Bus 930 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 905 to system memory.

Optionally, operator and administrative interfaces, such as a display, keyboard, and a cursor control device, may also be coupled to bus 930 to support direct operator interaction with computer system 900. Other operator and administrative interfaces can be provided through network connections connected through communication port 910.

Removable storage media 940 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present invention have been illustrated, and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:

intercepting, by a network manager associated with a private network, a data stream associated with streaming media content being requested from an external service provider by a client device associated with the private network, wherein the network manager is implemented within a network security device protecting the private network and is interposed between the external service provider and the client device; and limiting streaming options made available for streaming the streaming media content from the external service provider to the client device by:

identifying, by the network manager, a policy of a plurality of active policies that is applicable to the data stream;

identifying, by the network manager, a manifest associated with the streaming media content within the data stream, wherein the manifest contains information regarding a plurality of versions of the streaming media content that are available to be streamed by the external service provider;

determining, by the network manager, the plurality of versions of streaming media content by parsing the manifest;

determining, by the network manager, one or more prohibited versions of the plurality of versions of the streaming media content that exceed a bandwidth limitation specified by the policy;

updating, by the network manager, the manifest by removing information regarding the one or more prohibited versions from the manifest; and providing, by the network manager, the updated manifest to the client device; and wherein the streaming media content represents content including a video, and wherein the plurality of versions of the streaming media content represent the streaming media content in a form that has been encoded in different ways, wherein the manifest specifies a video adaptation set for the video, and wherein the video adaptation set includes representation information specifying the plurality of versions of the streaming media content.

2. The method of claim 1, wherein the plurality of versions of the streaming media content comprise one or more of 2160p (Ultra-HD), 1080p (Full HD), 720p (Half HD), 480p, 360p, and 240p.

3. The method of claim 1, wherein the manifest comprises a media presentation description (MPD) manifest.

4. The method of claim 1, wherein said intercepting, by a network manager associated with a private network, a data stream associated with streaming media content comprises intercepting a Hypertext Transport Protocol (HTTP) response from the external service provider directed to the client device.

5. The method of claim 1, wherein the plurality of active policies distinguishes among any or combination of user information, sub-net information, group information, a source of the streaming media content, a device type associated with the client device and type of streaming media content.

6. The method of claim 1, wherein the plurality of active policies is activated or deactivated based on any or combination of current bandwidth utilization by the private network and predicated further bandwidth utilization by the private network.

7. The method of claim 1, wherein the network manager comprises any or a combination of a unified threat management (UTM) device, an Intrusion Prevention System (IPS), Intrusion Detection System (IDS), a network security gateway, a firewall, and a Distributed Denial of Service (DDoS) prevention device.

8. The method of claim 1, wherein the client device comprises any or a combination of a mobile device, a laptop computer, a desktop computer, a set-to-box and an Internet Protocol Television (IPTV).

9. A non-transitory computer-readable storage medium embodying a set of instructions, which when executed by one or more processors of a network security device associated with a private network, having implemented therein a network manager, and interposed between an external service provider and a plurality of client devices within the private network, causes the one or more processors to perform a method comprising:
- intercepting a data stream associated with streaming media content being requested from the external service provider by a client device of the plurality of client devices; and
- limiting streaming options made available for streaming the streaming media content from the external service provider to the client device by:
- identifying a policy of a plurality of active policies that is applicable to the data stream;
- identifying a manifest associated with the streaming media content within the data stream, wherein the manifest contains information regarding a plurality of versions of the streaming media content that are available to be streamed by the external service provider;
- determining the plurality of versions of streaming media content by parsing the manifest;
- determining one or more prohibited versions of the plurality of versions of the streaming media content that exceed a bandwidth limitation specified by the policy;
- updating the manifest by removing information regarding the one or more prohibited versions from the manifest; and
- providing the updated manifest to the client device; and
- providing, by the network manager, the updated manifest to the client device; and
- wherein the streaming media content represents content including a video, and wherein the plurality of versions of the streaming media content represent the streaming media content in a form that has been encoded in different ways, wherein the manifest specifies a video adaptation set for the video, and wherein the video adaptation set includes representation information specifying the plurality of versions of the streaming media content.

10. The non-transitory computer-readable storage medium of claim 9, wherein the plurality of versions of the streaming media content comprise one or more of 2160p (Ultra-HD), 1080p (Full HD), 720p (Half HD), 480p, 360p, and 240p.

11. The non-transitory computer-readable storage medium of claim 9, wherein the manifest comprises a media presentation description (MPD) manifest.

12. The non-transitory computer-readable storage medium of claim 9, wherein said intercepting a data stream associated with streaming media content comprises intercepting a Hypertext Transport Protocol (HTTP) response from the external service provider directed to the client device.

13. The non-transitory computer-readable storage medium of claim 9 wherein the plurality of active policies distinguishes among any or combination of user information, sub-net information, group information, a source of the streaming media content, a device type associated with the client device and type of streaming media content.

14. The non-transitory computer-readable storage medium of claim 9, wherein the plurality of active policies is activated or deactivated based on any or combination of current bandwidth utilization by the private network and predicated further bandwidth utilization by the private network.

15. The non-transitory computer-readable storage medium of claim 9, wherein the network manager comprises any or a combination of a unified threat management (UTM) device, an Intrusion Prevention System (IPS), Intrusion Detection System (IDS), a network security gateway, a firewall, and a Distributed Denial of Service (DDoS) prevention device.

16. The non-transitory computer-readable storage medium of claim 9, wherein the client device comprises any or a combination of a mobile device, a laptop computer, a desktop computer, a set-to-box and an Internet Protocol Television (IPTV).

* * * * *